Feb. 22, 1938.                W. THAL                2,109,325
       SYSTEM FOR MEASURING A COMPONENT OF AN ALTERNATING
                CURRENT OR AN ALTERNATING VOLTAGE
                       Filed July 29, 1936
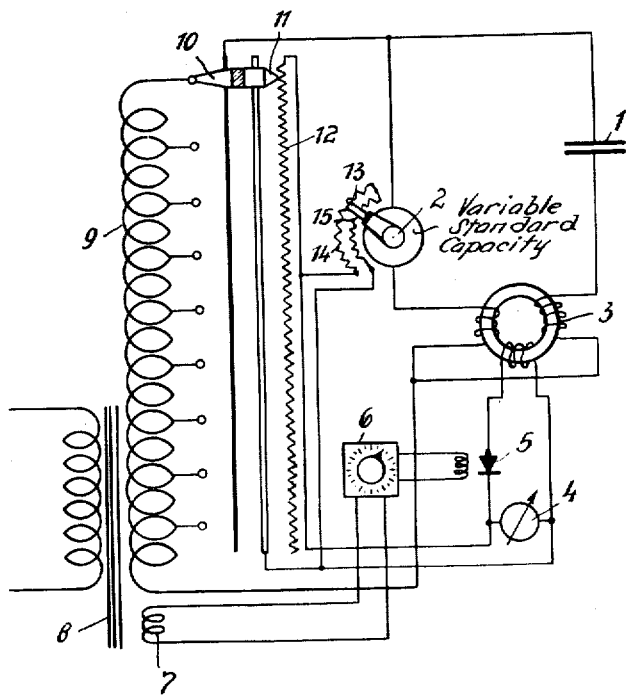
Inventor:
Wilhelm Thal
by Locka & Kehlenbeck
Attorneys Patented Feb. 22, 1938

2,109,325

UNITED STATES PATENT OFFICE 2,109,325

SYSTEM FOR MEASURING A COMPONENT OF AN ALTERNATING CURRENT OR AN ALTERNATING VOLTAGE

Wilhelm Thal, Berlin-Siemensstadt, Germany, assignor to Siemens & Halske, Aktiengesellschaft, Siemensstadt, near Berlin, Germany, a corporation of Germany Application July 29, 1936, Serial No. 93,239
In Germany August 3, 1935

9 Claims. (Cl. 175—183)

My invention relates to a system for measuring a component of an alternating current or an alternating voltage, and more particularly to a system for measuring the loss angle of a condenser or the like.

In the art of testing electrical values the problem of determining a component of an alternating current or of an alternating voltage has since recently become more and more important, particularly when testing the loss angle, to which an ever-increasing importance is being attached. Bridge connections are, nowadays, preferably employed for such testings, in the case of which the measuring instrument or a connection containing the measuring instrument lies in the diagonal branch of the bridge. The aforesaid bridge connections are disadvantageous in that they require a relatively large amount of energy, since during the disturbance of the bridge balance only a very small portion of the total current flowing through the bridge also flows through the measuring instrument.

The disadvantage presented in the above-mentioned bridge connection is eliminated according to the invention by establishing a phase difference between the current or the voltage to be measured and a normal current or a normal voltage of equal magnitude but of predetermined position of phase. In this manner, it is possible to render the measurement not only far more accurate than by the use of a bridge method, but also the measuring instrument becomes considerably simpler and more sensitive.

In the accompanying drawing is shown an embodiment of my invention in diagrammatic form. In this case, it is assumed that the loss angle of a capacity is to be measured, a problem frequently presented in practice. The capacity to be measured is denoted by the numeral 1. 2 is a variable reference capacity practically free of losses. 3 is a differential transformer, 4 a direct-current instrument, 5 a separately excited rectifier, connected to one secondary winding 7 of a transformer 8 through a phase advancer 6. Another secondary winding 9 of the transformer 8 supplies the voltage necessary for the measuring system, the voltage being preferably variable within wide limits. A sliding contact 10 serves to tap off a desired voltage from the secondary winding 9 or to vary the voltage steadily during the measurement. The sliding contact 10 is firmly secured to a second sliding contact 11 which taps off from a stretched resistance wire 12 a part of the voltage corresponding to its position. With the rotary part of the standard condenser 2 which is shown schematically as circular casing having a rotary knob mounted thereon a contact bridge 13 is firmly connected, which contacts with two spaced segmental resistance wires 14, 15 and thus short-circuits depending upon the position thereof a larger or smaller portion of the resistance wires. The resistance wires 14 and 15 are so arranged with respect to the rotary part of the capacity 2 that with increasing capacity also the short-circuited portion of the resistances increases. Both the resistance wire 12 and the resistance wires 14 and 15 are connected in parallel relation to the measuring instrument 4 so that the sensitiveness of the measuring instrument varies in accordance with the length of the resistance wires tapped therefrom.

The transformer 3 is shown only schematically in the drawing. Preferably it is so designed as to avoid a stray field as far as possible. Particularly, the secondary winding should be, consequently, distributed over the entire periphery of the core and as far as possible also the two primary windings. Before the measurement is taken, the phase advanced is at first so adjusted that the exciting voltage for the separately excited synchronous switch 5 is in phase with the exciting voltage of the measuring system.

The capacity 2 is then varied till the measuring instrument 4 does not show any deflection. Since a pure wattless current flows through the capacity 2 the wattless current flowing to the capacity 1 to be measured is compensated for in this case. As soon as the phase advancer 6 is adjusted a further 90°, i. e., when measuring the watt component, the instrument will be deflected an amount corresponding to the loss angle of the condenser 1. The deflection of the instrument is at first dependent upon the magnitude of the capacity 1. Since in the case of the preadjustment the capacity 2 must be brought to an equal magnitude this capacity is provided with the above-described means in order to vary the sensitiveness of the measuring instrument 4 in such a manner that the indication is independent of the capacity. Besides, the sensitiveness of the measuring instrument depends upon the voltage applied to the system. In order to eliminate also this dependence the slide wire 12 is furthermore parallel connected to the measuring instrument 4, that is to say, in such a manner that with increasing voltage the parallel resistance formed of the slide wire 12 decreases continuously. Consequently, if in the case of an object to be tested, for instance, the loss angle is to be followed over the entire voltage range up to a permissible final value the sensitiveness of the measuring instrument 4 is then automatically decreased in accordance with the increase in voltage owing to the simultaneous displacement of the contacts 10 and 11, so that the sensitiveness of the entire measuring system remains uninfluenced.

The above-described embodiment represents only one of the various possible applications of the invention. Instead of the capacity also an alternating current resistance or the like may be measured with reference to the alternating-current properties thereof.

I claim as my invention:

1. In a system for measuring a component of an alternating current, a source of alternating current comprising means for varying the voltage of said source, a two-branch circuit connected with said source, one of said branches forming a test circuit of the current to be measured, the other of said branches forming a reference circuit, a differential transformer having two primary windings arranged to counteract each other and a common secondary winding, each of said primary windings being series connected in one of said two-branch circuits, means for balancing the magnitude of the current flowing in said reference circuit with the magnitude of the current flowing in said test circuit and for adjusting a given phase of the reference current, a measuring instrument connected in the circuit of said secondary winding, means in said secondary circuit for referring the indication of said measuring instrument to the given phase of said reference current, and means for varying the sensitiveness of said measuring instrument, said means being operatively connected with the aforesaid means for varying the voltage of said alternating current source in order to decrease the sensitiveness of said instrument with increasing voltage of said current source.

2. In a system for measuring a component of an alternating current, a transformer, means for adjusting the secondary voltage of said transformer, a two-branch arrangement connected with the secondary winding of said transformer, one of said two branches forming a test circuit of the current to be measured, the other of said branches forming a reference circuit, means in said two-branch arrangement for balancing the magnitude of the current flowing in said reference circuit and the magnitude of the current flowing in said test circuit and for adjusting a given phase of the reference current, a differential transformer having two counteracting primary windings, each of which is connected with one of said both branches, and one common secondary winding, a measuring instrument connected in the circuit of said secondary winding, means in the circuit of said secondary winding for referring the indication of said instrument to said predetermined phase of said reference current, a variable resistance in parallel connection to said instrument and means for varying said resistance, said means being operatively connected with the aforesaid means for adjusting the secondary voltage of the first-mentioned transformer in order to decrease the sensitiveness of said instrument with increasing values of said secondary voltage.

3. In an arrangement for measuring the alternating current properties of impedances, preferably capacities, in combination a two-branch circuit, means for producing a current to be measured in one branch and a synchronous reference current of equal magnitude and a given phase position in the second branch of said circuit, a variable impedance in said reference branch, the first-mentioned branch being designed to include the impedance to be tested, a differential transformer having two primary windings each of which is connected in one of said two branches and a common secondary winding, a measuring instrument connected in the circuit of said secondary winding, means in said secondary circuit for referring the indication of said instrument to the given phase of said reference current, and means for varying the sensitiveness of said instrument in accordance with variations of said variable impedance in order to render the indications of said instrument independent from variations of said variable impedance.

4. In an arrangement for measuring the loss angle of a capacity in combination a two-branch circuit, one branch of which is designed to include the capacity to be tested, a transformer for producing a current in said testing branch and a synchronous reference current in the second branch of said circuit, means in said two-branch circuit for balancing the magnitudes and for adjusting a predetermined phase difference of the currents in said two branches, a practically loss-free reference condenser of variable capacity in said reference branch, a differential transformer having two primary windings each of which is connected in one of said two branches and a common secondary winding, a direct current measuring instrument in the circuit of said secondary winding, a separately actuated commutator series-connected with said instrument, means for actuating said commutator synchronous with the current to be measured, a phase shifter connecting said actuating means with a secondary winding of said first-mentioned transformer, and means for simultaneously varying the capacity of said reference condenser and the sensitiveness of said instrument, said means being designed to render the indications of said instrument independent from variations of said reference condenser.

5. In a system for measuring a component of an alternating current, a source of alternating current including means for varying the voltage of said current, a two-branch arrangement connected with said source, one of said branches forming a test circuit of the current to be measured, the other branch forming a reference circuit, means in said two-branch arrangement for balancing the magnitudes and for adjusting a predetermined phase difference of the currents flowing in said two branches, a differential arrangement coupling said two branches with a third circuit, and being designed to transform a current corresponding to the difference between the current to be measured and the reference current into said third circuit, a measuring instrument in said third circuit, and means for adjusting the sensitiveness of said instrument, said means being operatively connected with the aforesaid means for varying the voltage of said source in order to simultaneously decrease the sensitiveness with increasing voltage.

6. In a system for measuring a component of an alternating current, a source of alternating current including means for varying the voltage of said current, a two-branch arrangement connected with said source, one of said branches forming a test circuit of the current to be measured, the other branch forming a reference circuit, means in said two-branch arrangement for balancing the magnitudes and for adjusting a predetermined phase difference of the currents flowing in said two branches, a differential arrangement coupling said two branches with a third circuit, and being designed to transform a current corresponding to the difference between the current to be measured and the reference current into said third circuit, a direct current measuring instrument in said third circuit, a mechanical rectifier in series connection with said direct current instrument, said rectifier having a magnetic actuating device, a phase shifter connecting said actuating device of said rectifier with said alternating current source, and means for adjusting the sensitiveness of said instrument in operative connection with said means for varying the voltage of said current source in order to decrease the sensitiveness with increasing voltage.

7. In a system for measuring impedances, a source of alternating current including means for varying the voltage of said current, a two-branch arrangement connected with said source, one of said branches containing the impedance to be measured, the other branch forming a reference circuit, means in said two-branch arrangement for balancing the magnitudes and for adjusting a predetermined phase difference of the currents flowing in said two branches, a differential arrangement coupling said two branches with a third circuit, and being designed to transform a current corresponding to the difference between the current to be measured and the reference current into said third circuit, a measuring instrument in said third circuit, a reference condenser of variable capacity in said reference circuit, means for simultaneously adjusting the capacity of said condenser and the sensitiveness of said instrument, said means being designed to render the indications of said instrument independent from variations of said capacity, and means for decreasing said sensitiveness with increasing voltage of said alternating current source.

8. In a system for measuring a component of an alternating current, a source of alternating current, a two-branch arrangement connected with said source, one of said branches forming a test circuit of the current to be measured, the other branch forming a reference circuit, means in said two-branch arrangement for balancing the magnitudes of the current of said reference circuit with the magnitude of the current to be measured and means for adjusting a given phase difference between said two currents, a differential transformer having two primary windings and a common secondary winding, each of said primary windings being series connected in one of said two-branch circuits, a mechanical commutator and a direct current measuring instrument series connected with each other in the circuit of said secondary winding, a magnetic device for actuating said commutator in synchronism with said current source, a phase displacer for adjusting the indication of said instrument to said given phase of the reference current, said phase displacer connecting said actuating device with said current source.

9. In a system for measuring a component of an alternating voltage, a transformer having two secondary windings, a two-branch arrangement connected with the first secondary winding of said transformer, one of said branches forming a test circuit of the voltage to be measured, the other branch forming a reference circuit, means in said two-branch arrangement for balancing the magnitudes of the voltage of said reference circuit with the magnitude of the voltage to be measured and means for adjusting a given phase difference between said two voltages, a differential transformer having two primary windings and a common secondary winding, each of said primary windings being series connected in one of said two-branch circuits, a mechanical commutator and a direct current measuring instrument series connected with each other in the circuit of said secondary winding, a magnetic device for actuating said commutator in synchronism with said current source, a phase displacer for adjusting the indication of said instrument to said given phase of the reference voltage, said phase displacer connecting said actuating device with the second secondary winding of said first-mentioned transformer.

WILHELM THAL.